(12) United States Patent  
Carley

(10) Patent No.: US 6,536,280 B1
(45) Date of Patent: Mar. 25, 2003

(54) THIN FILM MEMS SENSORS EMPLOYING ELECTRICAL SENSING AND FORCE FEEDBACK

(75) Inventor: L. Richard Carley, Sewickley, PA (US)

(73) Assignee: IC Mechanics, Inc., Pittsburgh, PA (US)

(*) Notice: Subject to any disclaimer, the term of this patent is extended or adjusted under 35 U.S.C. 154(b) by 176 days.

(21) Appl. No.: 09/659,961

(22) Filed: Sep. 12, 2000

(51) Int. Cl.$^7$ .............................. G01P 9/00; H01G 7/00
(52) U.S. Cl. ............................ 73/504.02; 73/514.18; 73/514.32; 361/283.1; 361/283.3
(58) Field of Search .................. 73/488, 504.03, 73/514.01, 514.24, 514.32, 514.38, 514.14, 514.18; 361/280, 283.1, 283.3

(56) References Cited

U.S. PATENT DOCUMENTS

| | | | | |
|---|---|---|---|---|
| 5,447,067 A | * | 9/1995 | Biebi et al. | 73/514.32 |
| 5,596,144 A | * | 1/1997 | Swanson | 73/514.18 |
| 5,618,989 A | * | 4/1997 | Marek | 73/1.38 |
| 5,780,948 A | * | 7/1998 | Lee et al. | 310/81 |
| 5,834,643 A | * | 11/1998 | Cheng | 73/105 |
| 5,914,507 A | * | 6/1999 | Polla et al. | 73/514.32 |
| 5,952,572 A | * | 9/1999 | Yamashita et al. | 73/504.04 |
| 5,992,233 A | * | 11/1999 | Clark | 73/514.35 |
| 6,012,335 A | * | 1/2000 | Bashir et al. | 73/724 |
| 6,035,714 A | * | 3/2000 | Yazdi et al. | 73/514.32 |
| 6,073,484 A | * | 6/2000 | Miller et al. | 73/105 |
| 6,105,427 A | * | 8/2000 | Stewart et al. | 73/514.32 |
| 6,151,967 A | * | 11/2000 | McIntosh et al. | 73/514.32 |
| 6,170,330 B1 | * | 1/2001 | Nakajima | 73/504.16 |
| 6,393,914 B1 | * | 5/2002 | Zarabadi et al. | 73/514.04 |
| 6,450,029 B1 | * | 9/2002 | Sakai et al. | 73/488 |

OTHER PUBLICATIONS

D.A. Kuester, R. Mahadevan, K.W. Markus, MUMPs Design Handbook, Cronos Integrated Microsystems, N.C., rev. 3, Oct. 1994.
Sandia National Laboratories, Intelligent Micro Machine Initiative, Oct. 10, 2000.
W.S.N. Trimmer and K.J. Gabriel, Sensors and Actuators, vol. 11, p. 189 (1987).
S. Hoen, P. Merchant, G. Koke and J. Williams, Electrostatic Surface Drives: Theoretical Considerations and Fabrications, 9th Int. Conf. on Solid–State Sensors and Actuators (Transducers '97), Chicago, IL, Jun. 1997, pp. 41–44.

* cited by examiner

Primary Examiner—Hezron Williams
Assistant Examiner—Jacques Saint-Surin
(74) Attorney, Agent, or Firm—Buchanan Ingersoll, P.C.

(57) ABSTRACT

This invention discloses a method for electronically decreasing the sensitivity of thin film movable micromachined layers to vibrations, accelerations, or rotations that would result in part or all of the movable layer being displaced in the direction of the film thickness. In addition, the disclosed method can also be used to remove some of the curvature introduced into thin film movable structures due to vertical stress gradients. Electronic stiffening is achieved by using position sensing and force feedback at one or more points on the movable micromachined structure. Precise servo control of Z axis height makes it possible to dramatically decrease the spacing between the movable MEMS layer or layers and fixed electrodes, which can lead to a dramatic increase in sensitivity and/or actuation force.

30 Claims, 6 Drawing Sheets

THIN FILM MEMS SENSORS EMPLOYING ELECTRICAL SENSING AND FORCE FEEDBACK Prior art structures have been developed specifically for use in actuators. These actuators employ a structure similar to that shown in FIG. 2. For example, it is known that an electrostatic linear motor can be fabricated. One major problem with these devices is that, as the actuation voltage on the structure is increased in order to move it in the X or Y planes, the undesired force in the Z direction pulls the movable structure down into contact with the electrodes below, thereby preventing any further motion. Existing research has focussed on methods of making the Z spring much stiffer than the X or Y spring. However, this typically requires that the springs have a very high aspect ratio, which is difficult to manufacture, resulting in a much more expensive MEMS device.

Because of the problems inherent with these types of devices, this invention is directed to a method for electrically flattening thin film movable mechanical structures and significantly improving their Z-axis mechanical stiffness, as well as compensating for any rotations about the X or Y axes. This method results in a significant reduction in manufacturing cost by making thin-film MEMS devices suitable for inertial sensing applications that would otherwise have required either thick-film MEMS devices or bulk silicon MEMS devices.

SUMMARY OF THE INVENTION

For purposes of this disclosure, the invention will be described in terms of a moveable MEMS structure that can be used as an accelerometer, however, the invention is equally applicable to any device having single or multiple moveable MEMS structures, located either beside each other or stacked along the Z axis.

It is well known to those of ordinary skill in the art that one way to detect motion of a moveable MEMS structure, is to apply a small amplitude high frequency periodic signal to it. The amplitude of this signal coupled onto adjacent stationary or moveable electrodes varies with the position of the MEMS device. The high frequency signal can either be imposed on the moveable MEMS structure, or onto nearby electrodes. In the case of the accelerometer example described herein, there are two sets of stationary interdigitated electrodes, which are finger-shaped, as well as a set of finger-shaped electrodes attached to the moveable MEMS structure. The capacitance between the finger-shaped electrodes on the movable MEMS structure and the nearby stationary finger-shaped electrodes can be measured by observing either the current, voltage or charge induced on those conductors by the high frequency signal applied to the movable MEMS structure. This is typically done by using a charge sensing amplifier, which is well known in the art. In this way, both the lateral position of the movable MEMS structure and its height along the Z axis above the finger-shaped electrodes can be measured, as the capacitance varies with the motion of the moveable MEMS structure. Measuring such capacitance variations in order to estimate the separation between conductors is well understood in the state of the art in MEMS.

To exemplify the invention, top and bottom electrodes have been added to the basic prior art structure illustrated in FIG. 4, thereby providing the capability of generating both upward and downward forces on the movable MEMS structure using purely attractive electrostatic forces.

The essence of the invention is as follows. A voltage is placed on the top electrode. This will generate an upward force on all parts of the movable structure. We can then apply a common voltage to the finger-shaped electrodes. This will generate a significant downward force on the movable MEMS structure. By sensing the Z height at one or many points on the movable MEMS structure and adjusting the common voltage on the finger-shaped electrodes, we can use feedback to keep the Z separation between the movable MEMS structure and the finger-shaped electrodes at a constant value. This will reject or servo out mechanical vibrations, accelerations, and rotations, even when the thin film itself is not stiff in the Z dimension. This method can be used to cancel out linear acceleration in the direction of the Z axis. Additionally, by varying the potential applied to the upper finger-shaped electrodes relative to the lower ones, the structure can also reject rotation about the X axis.

To reject rotations about the Y axis, electrodes under the movable MEMS structure have been added. Each of these electrodes is used to sense the separation between itself and the movable MEMS structure and to adjust the respective voltages in order to hold that separation constant. In this way, rotations about the Y axis will be removed by these feedback loops.

In addition to rejecting accelerations in the Z axis and rotations about the X and Y axes, the structure shown in FIG. 3 will also tend to flatten out the movable MEMS structure because it is sensing and servoing to a fixed value the Z axis height of the movable MEMS structure in several separate regions.

By applying a voltage difference between the fingers, a force can be generated in the X direction to cancel X acceleration. Note that the structure shown as an example of this invention cannot sense or cancel Y acceleration. To accomplish this would require the addition of horizontal fingers.

Currently in the prior art, cross axis sensitivity would have dramatically limited the applications and sensitivity that could have been achieved. However, by making use of this invention, extremely sensitive motion sensing MEMS devices can be manufactured using low cost thin-film fabrication techniques, and, in addition, these devices can have low Z axis sensitivity.

DETAILED DESCRIPTION

Figure 1:
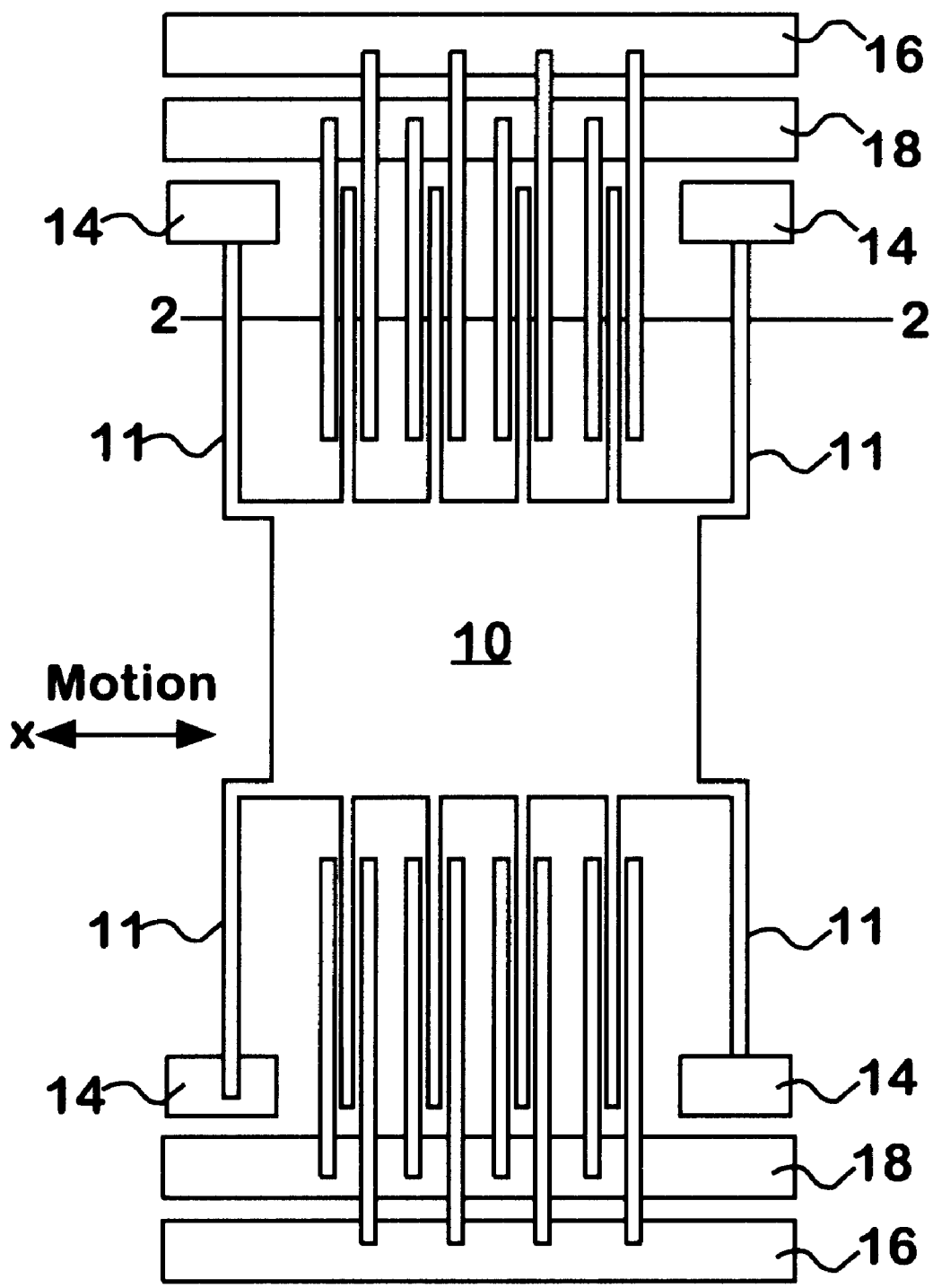
FIG. 1 shows a prior art accelerometer structure.
Figure 2:
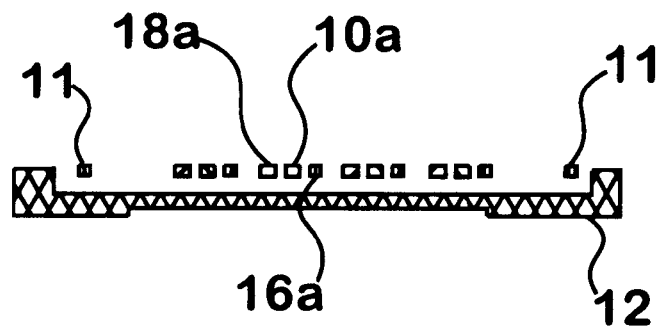
FIG. 2 is a cross-section of a portion of the accelerometer MEMS structure shown in FIG. 1.

FIG. 1 shows a prior art accelerometer. In this prior art accelerometer, moveable mass 10 is free to move in the X axis direction, shown by the arrow. Moveable mass 10 is anchored through beams 11 at anchor points 14. Electrode sets 16 and 18 have fingers attached thereto extending toward moveable mass 10. Moveable mass 10 also has fingers 10a attached thereto, interdigitated between the fingers from electrode sets 16 and 18. As shown schematically in FIG. 3, variable capacitances exist between moveable mass electrode fingers 10a and fingers 16a and 18a from electrode sets 16 and 18 respectively. As fingers 10a move in the X axis direction with moveable mass 10, the capacitance between fingers 10a and fingers 16a will vary, and, the capacitance between fingers 10a and 18a will vary inversely.

Figure 4:
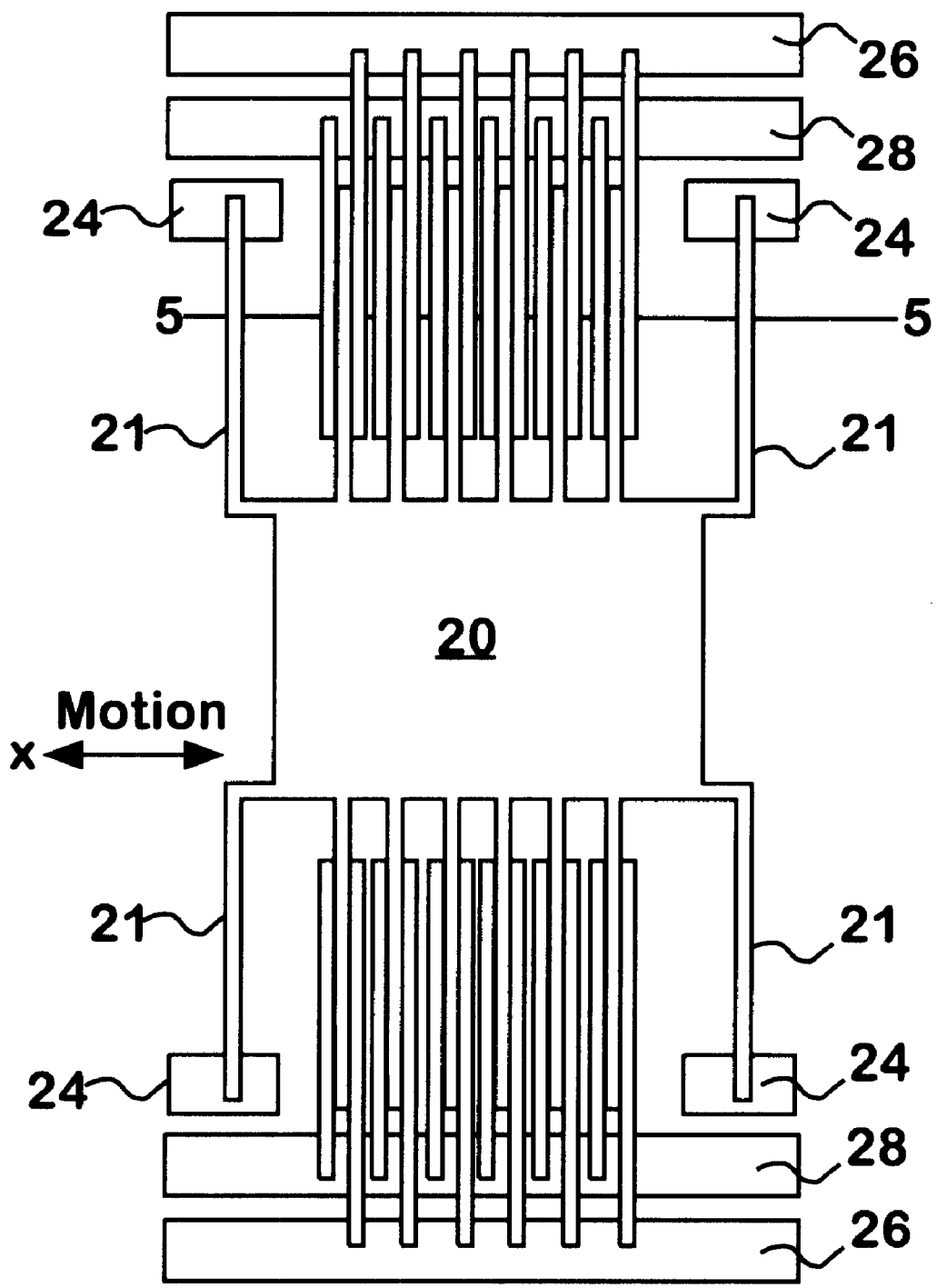
FIG. 4 is a second design of a prior art accelerometer structure.
Figure 5:
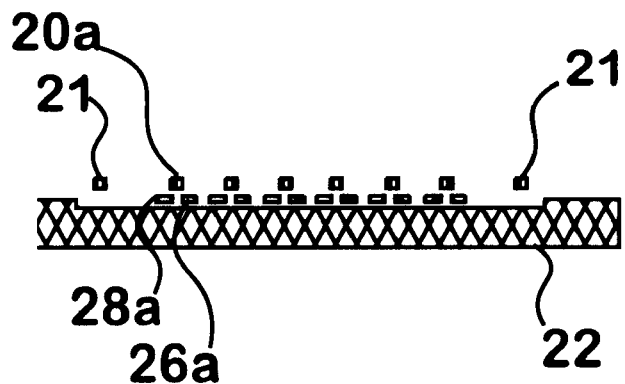
FIG. 5 is a cross-section of a portion of the prior art structure of FIG. 4.
Figure 6:
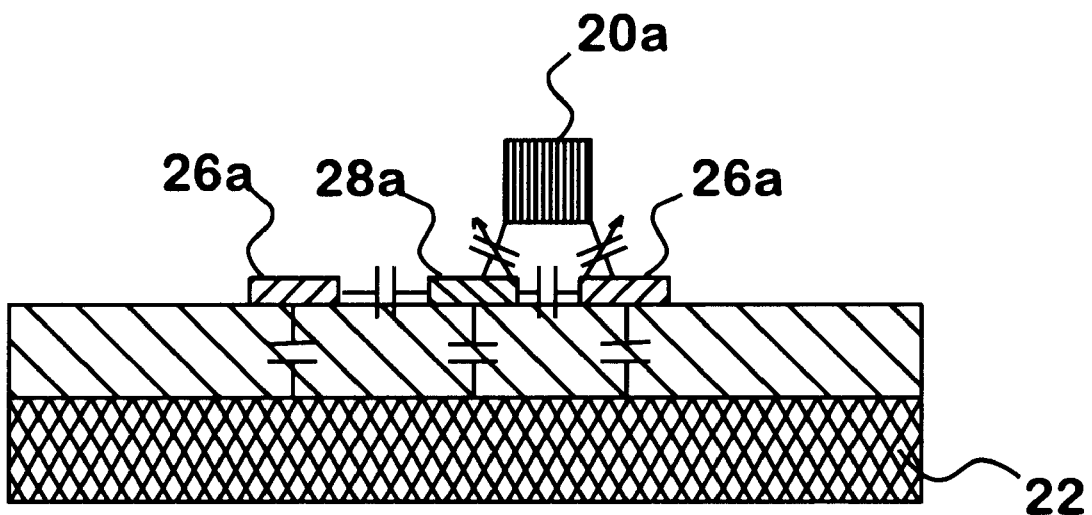
FIG. 6 is a schematic representation of the capacitance between various components of the structure of FIG. 4.

In a second prior art design shown in FIG. 4, moveable mass 20 is once again allowed to move laterally in the X axis. Moveable mass 20 is anchored at anchor points 24 by beams 21. Electrode sets 26 and 28 have fingers extending therefrom towards moveable mass 20. However, in this design as opposed to the first prior art example, fingers 20a from moveable mass 20 reside in a plane above fingers 26a and 28a from electrode sets 26 and 28 respectively. The movement of moveable mass 20 in the direction of the X axis causes a difference in capacitance between fingers 20a and 28a and between fingers 20a and 26a.

Two problems exist with the prior art designs. The first is that moveable masses 10 and 20 are able to move in the X direction but also are able to move along the Z axis and rotate about the X and Y axes. The accelerometer used to illustrate the present invention is able to servo out mechanical accelerations and vibrations in the Z direction, as well as rejecting rotations about the X and Y axes.

One of the major limitations of the design shown in FIG. 1 is that the sensitivity (i.e., the change in capacitance per unit change in X) is determined by the gap between the fingers. In FIG. 1, that gap is limited by photolithographic resolution and etch resolution. The prior art design of FIG. 4 overcomes this limitation by moving to a capacitor gap which is determined by the thickness of the sacrificial spacer layer use between electrodes 26a and 28a and moveable fingers 20a. Because this thickness can be much smaller that photolithographic resolution, higher sensitivity is achieved.

However, a major limitation of the structure shown in FIG. 4 is that a voltage difference is needed between electrodes 26a and 28a and moveable fingers 20a to sense the capacitance. This voltage difference generates a significant downward force on mass 20. In addition, external Z acceleration can also generate a downward force on mass 20. The usefulness of the FIG. 4 structure is limited by how stiff springs 21 can be made in the Z direction.

Figure 7:
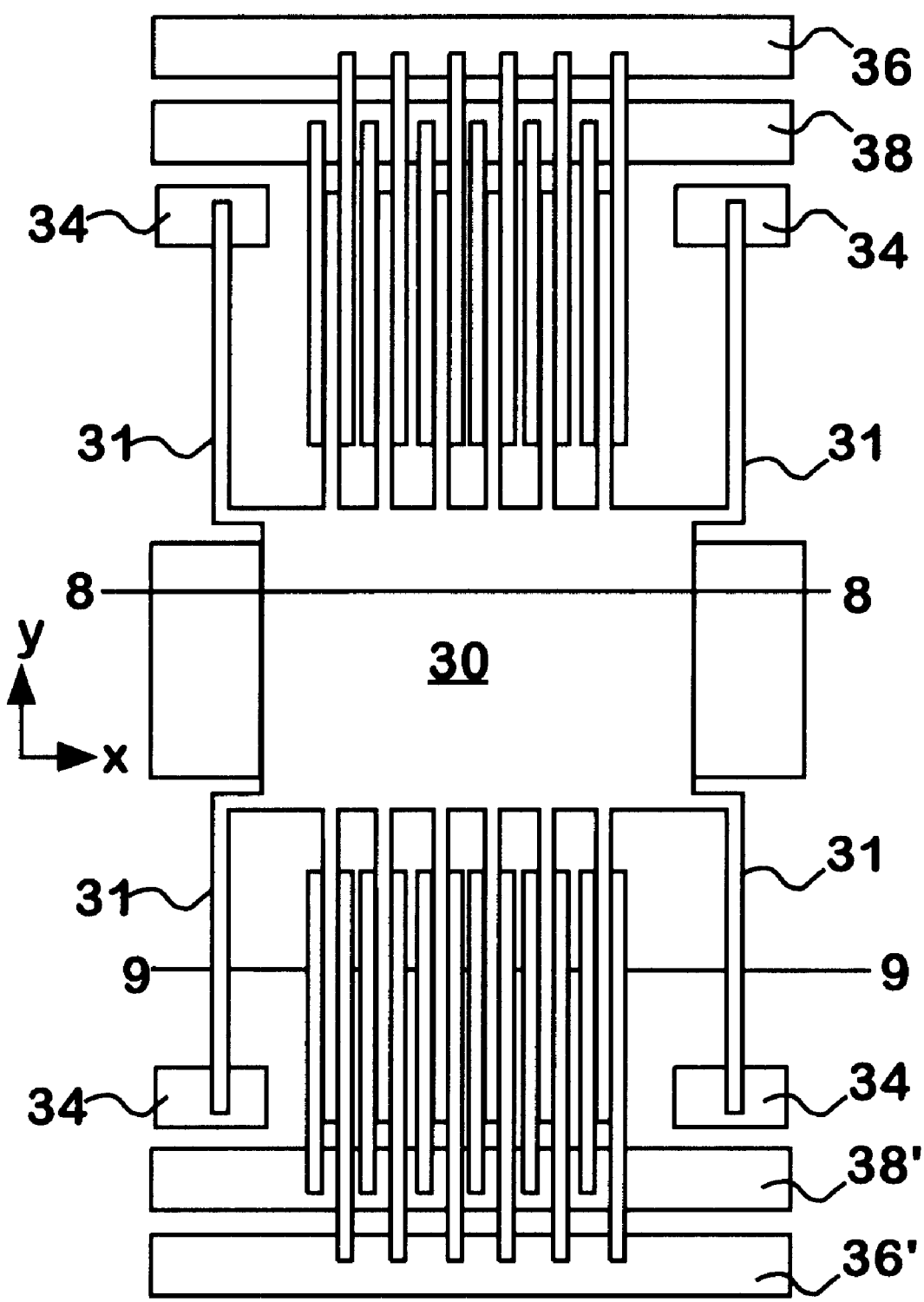
FIG. 7 shows a structure constructed according the preferred embodiment of the present invention.
Figure 8:
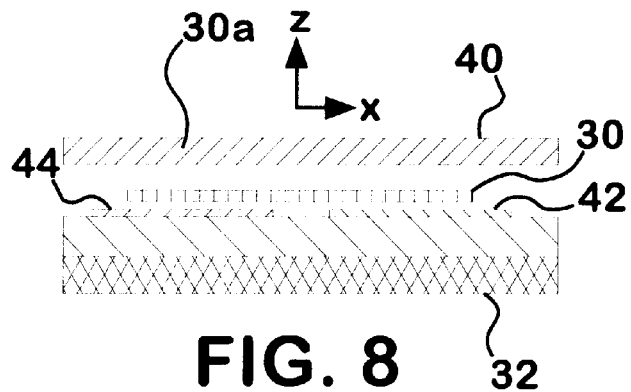
FIG. 8 is a cross-sectional view through the main portion of the structure of FIG. 7.
Figure 9:
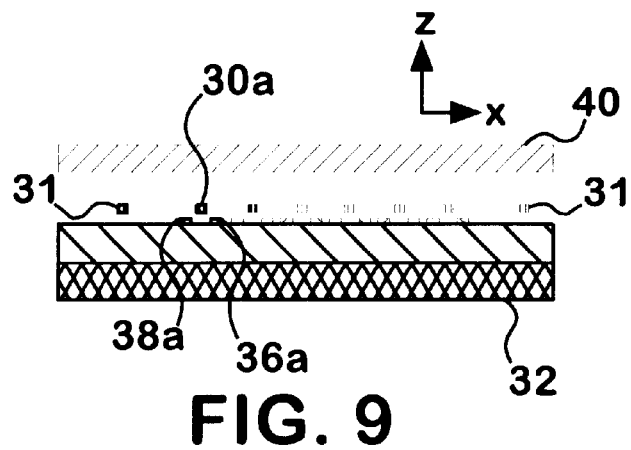
FIG. 9 is a cross-sectional view through another portion of the structure of FIG. 7.
Figure 10:
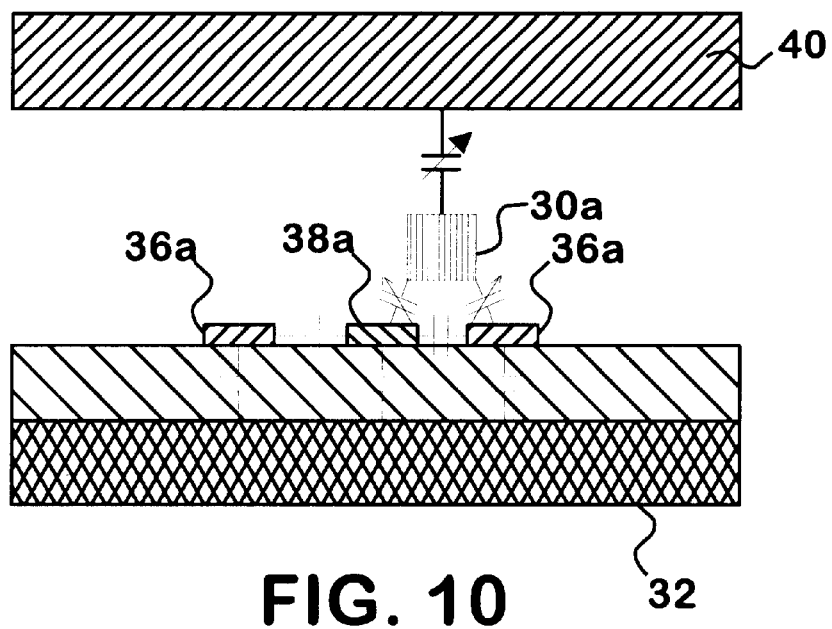
FIG. 10 is a schematic representation of the capacitance between various components of the structure of FIG. 7.

In the design of the present invention, an improvement has been made to the accelerometer shown in FIG. 4. FIGS. 7–9 show the addition of top electrode 40 as well as the addition of electrodes 42 and 44 underneath the moveable mass. The top electrode may be composed of many deposited layers, but the layer nearest the moveable MEMS structure would preferably be a conductor. Lower electrodes 42 and 44 may have been deposited on top of an insulator or may be suspended. In the case of the example of the lateral accelerometer of the prior art and of the present invention, there is only one moveable MEMS structure, with a fixed layer of electrodes below and above it. Note that upper electrode 40 need not be limited to a single electrode. A plurality of electrodes could be used, for example, if multiple moveable masses are being sensed and controlled. Likewise, lower electrodes 42 and 44 can actually be any number of electrodes appropriate for the application.

In operation, moveable structure 30, shown in FIGS. 7–9, would be held at a fixed potential and a small amplitude high frequency periodic signal would be impressed onto it. The frequency of this signal is typically chosen to be much higher than that to which the structure can respond mechanically. The capacitance between moveable mass 30 and electrode sets 36, 36', 38 and 38', or between moveable mass 30 and upper electrode 40 can be measured by observing either the current, voltage or charge induced on the conductors by the periodic signal applied to movable mass 30. This is typically done by using a charge sensing amplifier or other method well known to those of ordinary skill in the art. One skilled in the art would realize that this could also be reversed, with different high frequency signals applied to each electrode and the charge sensing amplifier connected to mass 30. Using these methods we can estimate both the lateral position of the moveable mass 30 and its Z height above electrodes 36, 36', 38 and 38' and their related fingers. This method of measuring the capacitance variations in order to estimate the separation between the conductors is also well known in the art.

The novelty in the present invention is to apply a voltage to the electrodes, both above and below moveable mass 30, using capacitance position sensing and electrostatic force feedback to dampen or eliminate the unwanted motions of moveable mass 30. A voltage is imposed on top electrode 40. This voltage generates an upward electrostatic force on all parts of the movable structure, including moveable mass 30 and beams 31. Additionally, a common voltage component is applied to electrodes 36, 36', 38 and 38'. This generates a significant downward electrostatic force on moveable mass 30. By sensing the Z height at one or multiple points on the structure as described above and adjusting the common voltage on electrodes 36, 36', 38 and 38', or on electrode 40, we can use force feedback to keep the Z separation between moveable mass 30 and electrodes 36, 36', 38 and 38' at a constant value. This will reject or servo out mechanical vibrations, accelerations and rotations in the Z axis. Additionally, it is possible to measure the acceleration in the Z direction by determining how much force is necessary to keep movable mass 30 in position.

Note that if there is a single common voltage on electrodes 36 and 38 then this structure can only cancel out a linear acceleration in the Z direction. However, if the common potential applied to electrodes 36 and 38 is different from the common potential applied to electrodes 36' and 38', the feedback force on the top and bottom can be adjusted to keep the Z height of the comb fingers on both the top and the bottom constant, thereby damping or eliminating rotations about the X axis.

To reject rotations about the Y axis, electrodes 42 and 44 must be added. Both of these electrodes are used to sense the separation between moveable mass 30 and electrode 42 and 44 respectively and to adjust the respective voltage in order to hold the separation constant. In this way, rotation about the Y axis will also be damped or eliminated. Electrodes 42 and 44 may be used only to sense changes in capacitance, or also, by imposing a voltage thereon, to provide further downward electrostatic forces on moveable mass 30. It is also possible to have multiple electrodes under moveable mass 30 instead of just electrodes 42 and 44. For example, four separate electrodes could be placed below the four corners of moveable mass 30 to give greater sensitivity to the cancellation of rotations in the X and Y axes.

Figure 3:
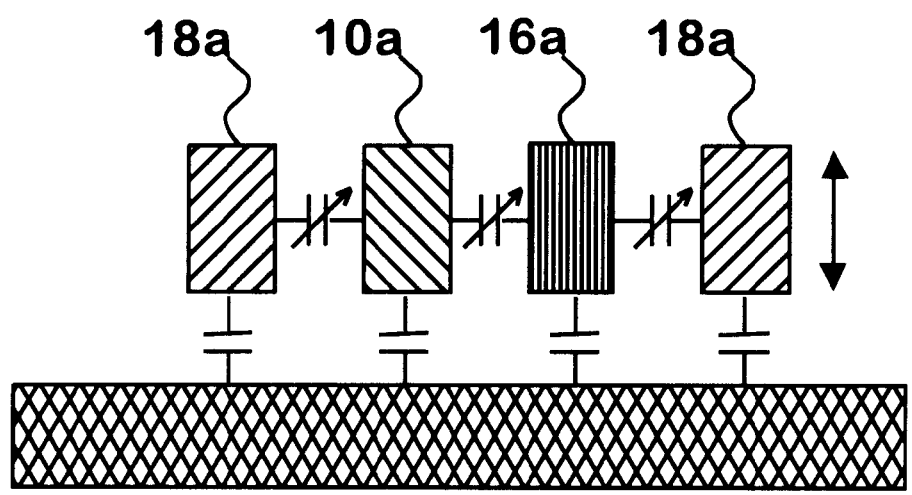
FIG. 3 is a schematic representation of the capacitance between various components of the structure of FIG. 1.

By rejecting Z accelerations and rotations about the X and Y axes, the structure shown in FIG. 3 will also tend to flatten out movable mass 30, because it is sensing and servoing to a fixed value the Z height of the movable mass 30 in multiple separate regions.

The novelty of this invention lies in the addition of the top electrode 40 and bottom electrodes 42 and 44, and the addition of electronics, the design of which is well understood in the art, to sense the changes in capacitance and to cancel out the accelerations in the Z direction and rotations about the X and Y axes by the application of variable voltages to the appropriate electrodes to provide electrostatic forces acting on moveable mass 30.

This invention is applicable to any number of different types of structures having moveable MEMS members, and it is not restricted to structures having only one movable layer, nor to structures that are anchored. This concept can be applied to MEMS structures having multiple moveable layers and multiple fixed thin film layers, regardless of their application. Therefore, the actual scope of the invention is embodied in the claims which follow and is not intended to be limited by the examples of structures used herein.

I claim:

1. In a microelectromechanical structure having one or more moveable masses, said one or more masses being capable of movement in one or more dimensions, a method for controlling undesired movements of said one or more moveable masses comprising the steps of:

providing one or more electrodes near said mass, thereby forming one or more variable capacitances between said electrodes and said one or more moveable masses;

measuring the variations in the capacitance of said one or more variable capacitances due to movement of said one or more masses;

imposing a voltage on one or more of said electrodes, thereby creating an electrostatic force between said one or more electrodes and said one or more moveable masses; and varying the magnitude of said voltage on said electrodes as a function of said measured variations in said capacitance of said one or more capacitive interfaces.

2. The method of claim 1 wherein said step of measuring capacitance variations is performed by imposing a high frequency signal on said one or more masses and sensing the current, voltage or charge thereby induced on said one or more electrodes.

3. The method of claim 1 wherein said step of measuring capacitance variations is performed by imposing a high frequency signal on one or more of said electrodes and sensing the current, voltage or charge thereby induced on said one or more masses.

4. In a microelectromechanical structure having one or more moveable masses, said one or more masses being capable of movement in one or more dimensions, a method for controlling undesired movements of said one or more moveable masses comprising the steps of:

providing a first plurality of finger-shaped electrodes connected to said one or more moveable masses;

providing a second plurality of stationary finger-shaped electrodes; and providing a third plurality of stationary finger-shaped electrodes interdigitated with said second plurality of electrodes;

wherein said second and third pluralities of electrodes are disposed in a plane below said first plurality of electrodes such that movement of said first plurality of electrodes with respect to said second and third pluralities of electrodes causes variations in the capacitance between said first plurality of electrodes and said second and third pluralities of electrodes;

measuring said variations in the capacitance of said one or more variable capacitances due to movement of said one or more masses;

imposing a voltage on one or more of said electrodes, thereby creating an electrostatic force between said one or more electrodes and said one or more moveable masses; and varying the magnitude of said voltage on said electrodes as a function of said measured variations in said capacitance of said one or more capacitive interfaces.

5. The method of claim 4 wherein said step of imposing a voltage includes imposing a variable voltage on said second and third plurality of electrodes, thereby imparting a downward electrostatic force on said one or more movable masses.

6. The method of claim 5 wherein said step of providing one or more electrodes further includes providing one or more stationary electrodes above said one or more movable masses.

7. The method of claim 6 wherein said step of imposing a voltage further includes imposing a variable voltage on said one or more electrodes above said one or more movable masses, thereby imparting an upward electrostatic force on said one or more movable masses.

8. The method of claim 7 further comprising the step of detecting movement of said one or more moveable masses along the Z axis and applying a variable voltage to each of said second and third pluralities of electrodes and said one or more electrodes above said one or more moveable masses to dampen said movement of said one or more moveable masses about the Z axis.

9. The method of claim 8 wherein said step of detecting movements along the Z axis includes the step of detecting variations in the capacitance between individual ones of first plurality of electrodes and individual pairs of said second and third pluralities of electrodes corresponding to said individual ones of said first plurality of electrodes.

10. The method of claim 5 wherein said step of providing one or more electrodes further includes providing one or more electrodes below said one or more movable masses.

11. The method of claim 10 wherein said step of imposing a voltage further includes imposing a variable voltage on said one or more electrodes below said movable mass, thereby imparting a downward electrostatic force on said one or more movable masses.

12. The method of claim 11 further comprising the step of detecting rotations of said one or more moveable masses about the X and/or Y axes and applying a variable voltage to each of said one or more electrodes below said one or more moveable masses to dampen said rotations of said one or more moveable masses about the X and/or Y axes.

13. The method of claim 12 wherein said step of detecting rotations includes the step of detecting variations in the capacitance between individual ones of first plurality of electrodes and individual pairs of said second and third pluralities of electrodes corresponding to said individual ones of said first plurality of electrodes.

14. A microelectromechanical structure comprising:

one or more moveable masses, said one or more moveable masses capable of movement in one or more dimensions;

one or more electrodes disposed near said one or more masses, such as to form one or more variable capacitances between all or a subset of said electrodes and said masses; and circuitry, coupled to said one or more moveable masses and said one or more electrodes, for measuring said variance in said capacitances when said one or more moveable masses moves and for arresting said movement of said one or more moveable masses by creating a voltage potential between all or a subset of said electrodes and said one or more moveable masses.

15. A microelectromechanical structure comprising:

one or more moveable masses, said one or more moveable masses capable of movement in one or more dimensions;

a first plurality of finger-shaped electrodes connected to said one or more moveable masses;

a second plurality of stationary finger-shaped electrodes;

a third plurality of stationary finger-shaped electrodes interdigitated with said second plurality of electrodes;

a means for imposing a variable voltage on said second and third pluralities of electrodes; and circuitry, coupled to said one or more moveable masses and said one or more electrodes, for measuring the variance in capacitances when said one or more moveable masses moves and for arresting said movement of said one or more moveable masses by creating a voltage potential between all or a subset of said electrodes and said one or more moveable masses, wherein said second and third pluralities of electrodes are disposed in a plane below said first plurality of electrodes such that movement of said first plurality of electrodes with respect to said second and third pluralities of electrodes causes variations in the capacitance between said first plurality of electrodes and said second and third pluralities of electrodes which can be measured by said circuitry.

16. The microelectromechanical structure of claim 15 wherein said one or more moveable masses are disposed in a single plane.

17. The device of claim 16 further comprising one or more stationary electrodes disposed above said one or more moveable masses.

18. The device of claim 17 further comprising a means for imposing a one or more variable voltages on said one or more stationary electrodes disposed above said one or more moveable masses for damping said movement of said masses by creating a voltage potential between said masses.

19. The device of claim 16 further comprising one or more electrodes disposed below said one or more moveable masses.

20. The device of claim 19 further comprising a means for imposing one or more variable voltages on said one or more electrodes disposed below said one or more moveable masses for damping said movement of said masses by creating a voltage potential between said masses.

21. The device of claim 16 further comprising one or more stationary electrodes disposed above said one or more moveable masses and one or more stationary electrodes disposed below said one or more moveable masses.

22. The device of claim 21 further comprising:

a means for imposing one or more variable voltages on said one or more stationary electrodes disposed above said one or more moveable masses; and a means for imposing one or more variable voltages on said one or more stationary electrodes disposed below said one or more moveable masses;

wherein a voltage potential is created between said electrodes and said one or more moveable masses and for damping said movement of said one or more moveable masses.

23. The microelectromechanical structure of claim 15 wherein said one or more moveable masses are disposed in a plurality of planes, thereby forming variable capacitances between moveable masses located in different planes.

24. The microelectromechanical structure of claim 23 further comprising circuitry coupled to said one or more moveable masses, for measuring variable capacitances between said one or more moveable masses when said masses move and for arresting said movement of said masses by creating a voltage potential between said masses.

25. The device of claim 24 further comprising one or more stationary electrodes disposed above said one or more moveable masses.

26. The device of claim 25 further comprising a means for imposing a one or more variable voltages on said one or more stationary electrodes disposed above said one or more moveable masses for damping said movement of said one or more moveable masses.

27. The device of claim 24 further comprising one or more electrodes disposed below said one or more moveable masses.

28. The device of claim 27 further comprising a means for imposing one or more variable voltages on said one or more electrodes disposed below said one or more moveable masses for damping said movement of said one or more moveable masses.

29. The device of claim 24 further comprising one or more stationary electrodes disposed above said one or more moveable masses and one or more stationary electrodes disposed below said one or more moveable masses.

30. The device of claim 29 further comprising:

a means for imposing one or more variable voltages on said one or more stationary electrodes disposed above said one or more moveable masses; and a means for imposing one or more variable voltages on said one or more stationary electrodes disposed below said one or more moveable masses;

wherein a voltage potential is created between said electrodes and said one or more moveable masses and for damping said movement of said one or more moveable masses.

* * * * *